Feb. 4, 1941.  A. E. BRONSON  2,230,879
METHOD OF MANUFACTURING RUBBER TIRE TUBE AND VALVE STEM UNITS
Filed Feb. 12, 1937   2 Sheets-Sheet 1

INVENTOR.
ADELBERT E. BRONSON
BY Kwis Hudson & Kent
ATTORNEYS

Feb. 4, 1941.   A. E. BRONSON   2,230,879
METHOD OF MANUFACTURING RUBBER TIRE TUBE AND VALVE STEM UNITS
Filed Feb. 12, 1937   2 Sheets-Sheet 2

INVENTOR.
Adelbert E. Bronson.
BY
ATTORNEYS

Patented Feb. 4, 1941

2,230,879

UNITED STATES PATENT OFFICE 2,230,879

METHOD OF MANUFACTURING RUBBER TIRE TUBE AND VALVE STEM UNITS

Adelbert E. Bronson, Shaker Heights, Ohio, assignor to The Dill Manufacturing Company, Cleveland, Ohio, a corporation of Ohio Application February 12, 1937, Serial No. 125,465

12 Claims. (Cl. 18—59)

This invention relates to the method of manufacturing at the same time and as an integrated unit a tire tube or other inflatable rubber article and valve stem therefor.

This application is a continuation in part of my application Serial No. 39,593, filed September 7, 1935.

There are now in use two general types of valve stems, namely, the all metal stem and the rubber valve stem. The rubber valve stem comprises a rubber base having an integral outstanding tubular portion in which is secured a tubular metal insert for receiving the valve insides or core. It has been customary to make these rubber stems separately from the manufacture of the tire tubes or articles upon which they are to be used; the stems being completely formed or shaped and at least partially cured or vulcanized prior to attachment to the tubes. The rubber stems thus separately manufactured and vulcanized or cured are secured to the tire tubes or other articles by means of cement or by vulcanization as is well known in the art.

An object of the present invention is to provide the most economical and efficient method of manufacturing at the same time and as integrated units rubber valve stems and tire tubes or other inflatable articles and wherein formed uncured tubes and unformed or partially formed uncured rubber valve stems having metal inserts therein are positioned in a curing mold and simultaneously vulcanized to cure the uncured tubes and stems and to impart to the latter the final or finished valve stem form and merge and integrally unite the tubes and stems and mold and secure the inserts in the latter thereby eliminating separate and multiplied manufacturing operations or steps.

In the manufacture of rubber valve stems separately from the manufacture of tire tubes or other inflatable rubber articles and the subsequent uniting of the stems to the tubes or articles by vulcanization, a good attachment between the stems and articles or tubes does not always take place due to the fact that the stems may be constructed of rubber having different vulcanizing characteristics from the rubber of which the tubes or articles are constructed and also because the stems are already partially cured at least, and consequently the curing of the rubber in the tubes and the rubber in the stems during the vulcanization of the same to unite the stems to the tubes may not be to the required extent in each instance.

A further object of the present invention is to provide a method of manufacturing at the same time rubber valve stems and tire tubes from crude rubber stock and then by a single vulcanizing step simultaneously curing the rubber of the stems and tubes to the required extent and merging and uniting the stems and tubes into an integrated unit.

Another object is to provide a valve stem wherein the base of the stem is of improved and novel construction and of such character that it is relatively thin and can be permanently secured to the inner tube or other rubber article, and although conforming to the configuration of the tube or article will possess the desired and necessary strength.

Another object is to provide a valve stem which may be readily applied to any portion of the inner tube of a pneumatic tire or other rubber article and can be so secured to the tube or article as to become, in effect, an integral part thereof.

A further object is to provide a valve stem which can be vulcanized or integrally united to a tire tube or other rubber article and which is provided with a pliable insert formed of suitable material such as thin pliable sheet metal, wire fabric or screening, cord fabric or other and similar materials.

Another and important object is to provide a valve stem which has all the attributes of a rubber valve stem, but which is cheaper to manufacture and apply to a tire tube or other rubber article than is the ordinary rubber valve stem.

Another object is to provide a valve stem which, in addition to being vulcanized to the tire tube or other rubber article, has its base mechanically secured to the tube or article.

Further and additional objects and advantages not hereinbefore specified will become apparent hereinafter during the detailed description which is to follow of several embodiments of the invention.

Referring to the accompanying drawings.

Figure 12:
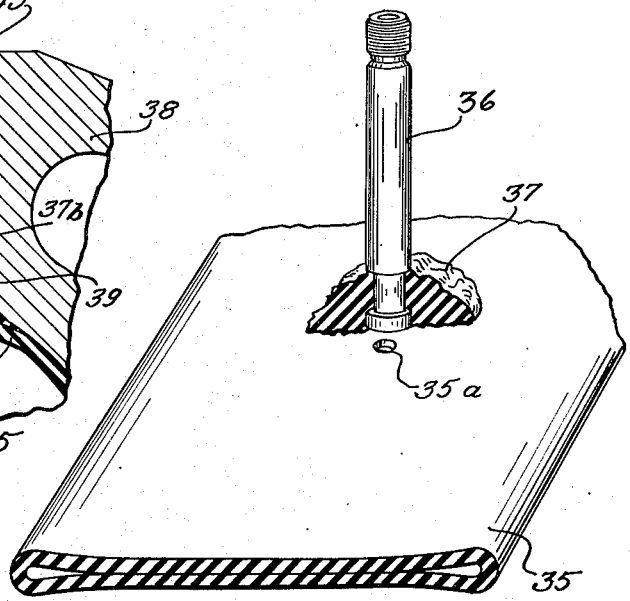

Fig. 12 is a fragmentary perspective view of a formed uncured tire tube together with a tubular rigid member or insert, upon the lower end of which is mounted a piece of crude rubber stock to approximate a valve stem and said view illustrates the manner in which the unformed or partially formed valve stem and tube are positioned together in carrying out the method later to be referred to herein, the piece of crude rubber on the member or insert being shown in section.

Figure 13:
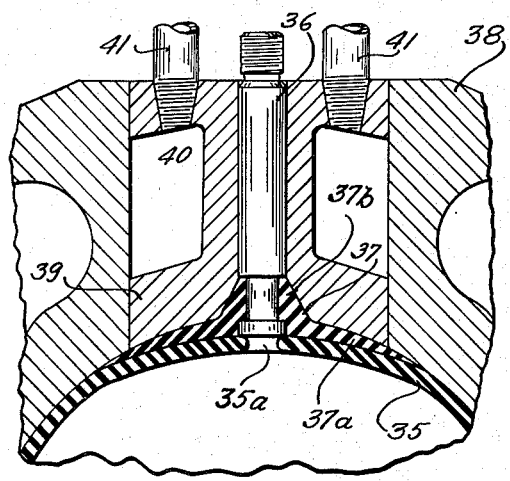

Fig. 13 is a fragmentary sectional view through a curing mold such as a mold of the watch case type, and shows the tire tube and valve stem arranged in the mold and being cured and merged into an integrated unit by a single molding and vulcanizing or curing process, the rubber stem being shown as shaped into final valve stem form by a suitable valve stem cavity of the curing mold.

Figure 14:
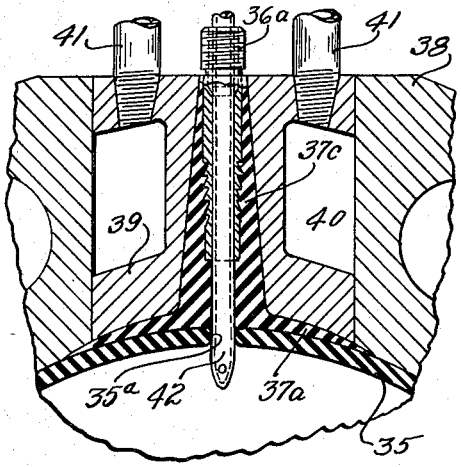
Figure 15:
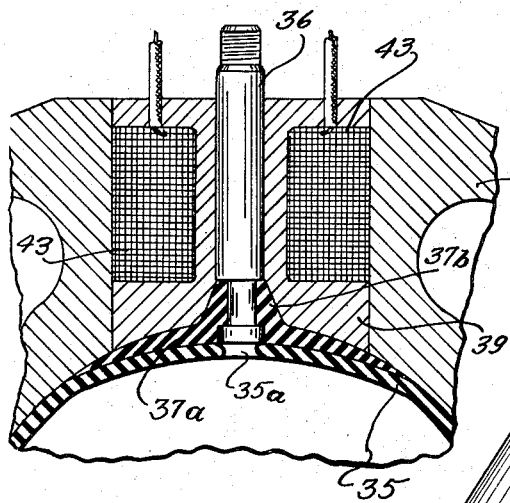

Fig. 14 is a view similar to Fig. 13 but illustrates a different form of valve stem from that shown in Fig. 13, in that the rubber of the stem extends outwardly of the tubular rigid member to adjacent the threaded nipple at the outer end thereof; a hollow needle also being shown as used to perforate the piece or chunk of rubber and the tube and through which fluid pressure is introduced to inflate the tube, and Fig. 15 is a view similar to Fig. 13 but illustrates a slightly modified form of mold and one wherein an electrical heating unit is employed for imparting the requisite heat of vulcanization to the rubber of the valve stem.

The present invention contemplates a method of manufacturing at the same time and as integrated units tire tubes and rubber valve stems therefor, and which is of such character as to be very economical and efficient in that but a single molding and vulcanizing operation is required for curing the stems and tubes to the required extent and uniting and merging the same integrally together.

Briefly one way in which the contemplated method may be carried out is to form the tire tube from uncured rubber stock and then upon the outer surface of the formed tube position a rigid member on the lower end of which is a piece of uncured rubber stock to approximate a valve stem. The piece of uncured rubber stock when pressed against the outer surface of the tube acts to hold the rigid member in position on the tube and enables the tube and member to be placed in a curing mold having a valve stem cavity therein which acts, during the curing operation, to impart to the piece of stock its final valve stem form and to press the same closely about the rigid member. When the tube with the piece of stock is mounted in the curing mold and the tube is inflated, the latter will fill the mold and be firmly pressed against the piece of stock and force the latter, which has been located contiguous to the valve stem cavity, into tight engagement with the wall of said cavity, after which the inflated tube and the piece of stock are cured by the application of heat thereto in a single curing operation, whereby the rubber of the stem is merged and integrally united with the rubber of the tube. Of course the piece of stock need not be positioned on the outer surface of the tube before the latter is positioned in the curing mold since it is evident that the piece of stock could be separately positioned in the valve stem cavity of the mold before or after the tube has been positioned in the mold and the same results could be obtained. In carrying out the method and in order that the rubber of the tube and the rubber of the stem will be vulcanized to the required extent, it is desirable since the stem is usually thicker than the tube and would otherwise require a longer time for curing or vulcanization than the tube to subject the rubber of the stem to greater heat than is applied to the tube, and this can be accomplished by the application of heat in close proximity to the stem.

The present invention further contemplates a valve stem construction which includes an insert reenforcement to which the tubular rigid member of the stem is suitably secured and which reenforcement is formed of a suitable pliable material having sufficient strength to provide a strong reenforcement in the attachment of the valve stem to a tire tube or other rubber article, and in addition to providing an attachment of the stem to the tube or article by vulcanization, also provides a mechanical attachment between the stem and tire tube or article. Although the insert reenforcement for the base of the valve stem, as referred to above, may be of various pliable materials, it is preferred to employ such materials as thin pliable sheet metal, wire cloth or screening, cord fabric or other suitable materials, and accordingly illustrations of embodiments of the invention utilizing these materials have been shown in the drawings and will be described herein by way of example.

Figure 1:
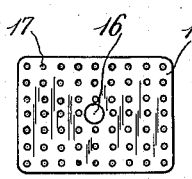
Fig. 1 is a detail plan view of one form of insert which may be used in the base of the valve stem.
Figure 2:
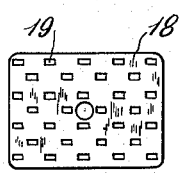
Fig. 2 is a view similar to Fig. 1, but illustrates another form of insert for the valve stem base.

In Figs. 1 and 2 there are illustrated reenforcing inserts for the bases of the valve stem in the form of pieces of thin pliable sheet metal, such as sheets of thin brass or copper or any other metal to which rubber can be made to adhere. In Fig. 1 the reenforcement 15 is provided with an opening 16, preferably arranged centrally thereof and adapted to receive the end of the tubular rigid member of the valve stem, which is provided with a reduced extension that projects through and slightly beyond the underside of the insert reenforcement. The insert reenforcement 15 is also provided with a plurality of small perforations 17, the purpose of which will later be more fully set forth. The insert reenforcement 18 shown in Fig. 2 is similar to the insert reenforcement 15, except that it is provided with a plurality of oblong or rectangular openings 19 and which are preferably arranged in staggered or off-set relation to each other. The metal valve stem 20 may be of usual construction and, as will be understood, is adapted to receive the customary valve core or valve insides, and said stem is mounted on the insert reenforcements 15 or 18 by the reduced extension at the inner end of the stem extending through the opening 16, and the stem and insert reenforcement are then secured together by brazing, electric welding or by otherwise suitably securing the stem in position as indicated at 21 in Fig. 3.

A valve constructed of the stem 20 and either the insert reenforcement 15 or the insert reenforcement 18 with the stem and insert reenforcement connected together by brazing or other means previously referred to can be secured to a tire tube in the following manner: The insert reenforcement preferably, but not necessarily, is dipped into a suitable solution to which rubber will adhere, such as rubber cement, and is then dried. As will be explained more in detail hereinafter, the valve stem would preferably be secured to the tire tube by positioning the insert reenforcement on any desired part of the crude rubber tube during the manufacture of the latter, after which a piece or patch of crude rubber stock would be placed over the insert reenforcement and stem and then when the tube was vulcanized or cured the base or patch of crude rubber stock would be formed into shape and cured simultaneously with the tube, and the insert reenforcement, stem and patch or base would become an integral part of the tube with the insert reenforcement lying between the outer side of the tube and the underside of the patch or base, although, of course, after vulcanization the patch and tube would, in effect, become substantially a single piece of rubber.

Figure 3:
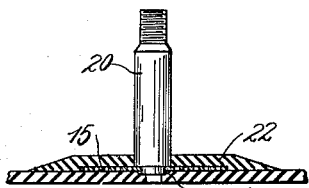
Fig. 3 shows a valve stem secured to the insert illustrated in Fig. 1 and a rubber base applied to the insert and stem and is partly a sectional view through a tire tube to which the stem and base have been secured.

Referring to Fig. 3, the patch or base which has been previously mentioned is indicated at 22, and the manner in which it will be arranged over the insert reenforcement and vulcanized to the tube can readily be ascertained from an inspection of this view.

Figure 4:
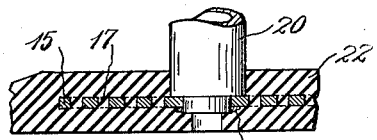
Fig. 4 is a fragmentary sectional view similar to Fig. 3 but on an enlarged scale to illustrate the mechanical union between the base of the valve stem and the tire tube.

In Fig. 4 which is a view similar to Fig. 3 but on an enlarged scale, the patch or base and tube are shown as vulcanized or united together, and it will be noted that the rubber of the patch and tube has passed through the perforations 17 of the insert reenforcement, wherefore the base of the stem is mechanically united to the tube by a multiplicity of rubber rivets extending through the insert reenforcement and is, in addition, connected to the tube by the fusion of the rubber of the patch or base and of the tube brought about by the simultaneous vulcanization or curing thereof. In Fig. 4 the insert reenforcement shown therein is the insert reenforcement 15 with the small round perforations 17, but it will be understood that the rubber of the tube and patch or base will extend through the rectangular or oblong openings 19 of the insert reenforcement 18 in a similar manner.

It will also be observed that the thin pliable insert reenforcement is secured to the tube in such manner as to insure an air-tight connection between the base of the stem and tube even though there might not be a perfect adhesion of the rubber of the tube and patch or base to the insert reenforcement after vulcanization, since, as it will be remembered, the base of the stem is united to the tube by the multiplicity of rivets extending through the openings of the insert reenforcement, and further because the end of the stem is secured to the insert reenforcement by brazing, electric welding, soldering or other similar means which guarantee an air-tight connection between the stem and insert reenforcement.

Figure 5:
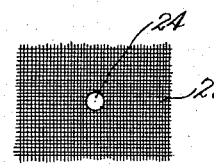
Fig. 5 is a view similar to Fig. 1 but illustrates a different form of insert for the valve stem base.

In Fig. 5 the insert reenforcement 23 is shown as formed of suitable wire cloth or wire screening, and such insert reenforcement when connected with the stem and mounted on the tube in the manner set forth previously will function in exactly the same way as would the first mentioned insert reenforcement, since the rubber of the patch or base and tube will, after being cured, extend through the meshes of the insert reenforcement 23 and form a mechanical connection between the base and tube. The stem 20 can be secured to the insert reenforcement 23 in various suitable ways, but, as shown herein, the reduced extension on the end of the stem passes through the opening 24 in the insert reenforcement and receives a thin metal washer 25 which is brazed, soldered or otherwise connected to the stem and to the insert reenforcement, so that the stem, insert reenforcement and washer when assembled together constitute a mechanical unit.

During the securing of the stem and insert reenforcement to the tire tube the insert reenforcement can be placed on any part of the tube as previously mentioned together with the crude rubber patch or base and the tube can then be pierced or inflated by suitable means, if it is not previously provided with an opening, as for example, by applying through the valve stem hole a hollow electric needle which will pierce the tube and thus permit, through the stem, inflation of the tube for vulcanization.

Figure 6:
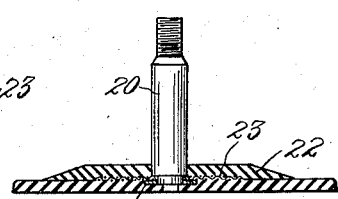
Fig. 6 is a view similar to Fig. 3 and shows a valve stem secured to the insert shown in Fig. 5 and the stem and base mounted on a tire tube with a fragmentary portion of the latter shown in section.
Figure 7:
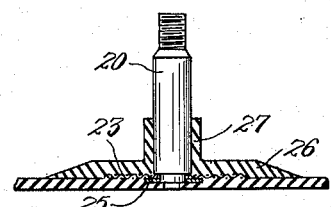
Fig. 7 is a view similar to Fig. 6 but shows a different form of valve stem base from that shown in Fig. 6.
Figure 8:
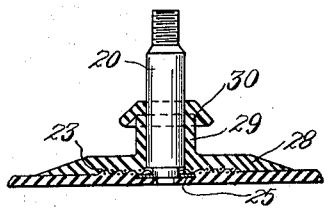
Fig. 8 is a view similar to Figs. 6 and 7 and shows a still different form of valve stem base from those shown in either of said views.

In Figs. 3, 4 and 6 the rubber patch or base 22 has been shown as a plain or substantially flat patch, but it should be understood that the patch may take various forms as desired. As illustrative of the different forms which the rubber patches or bases may take, reference should be made to Figs. 7, 8 and 9. In Fig. 7 the patch or base 23 is shown as provided with a centrally arranged upstanding boss 27 surrounding the valve stem and which would when a tube having the stem and patch secured thereto is mounted on a rim, extend through the rim opening and act to centralize the stem in the opening. In Fig. 8 the patch or base 28 is provided with a central outstanding boss 29, similar to the boss 27, but having at its outer end an out-turned conical flange 30 which when the stem and boss pass through the rim opening is compressed to allow such passage and then expands to engage the outer side of the rim adjacent to the rim opening and acts to seal said opening against the entrance of dirt, moisture or other foreign matter.

Figures 9, 11:
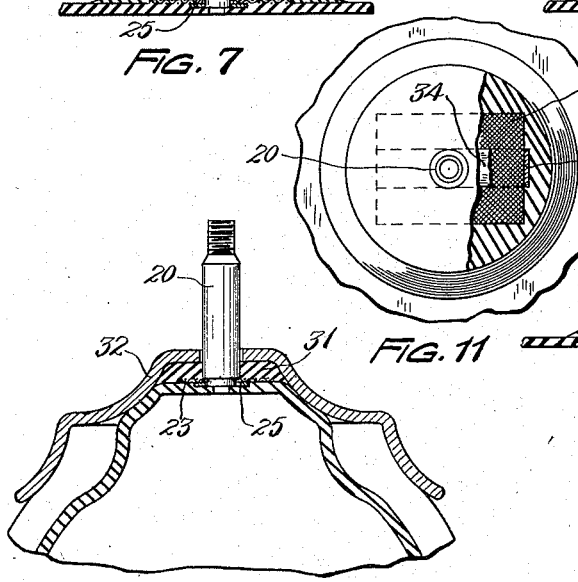
Fig. 9 is a sectional view through a tire rim with a tire casing and tube mounted thereon and illustrates a valve stem embodying the present invention and employing a still different form of valve stem base from any which have been previously shown.
Fig. 11 is a top plan view of Fig. 10 with a portion of the valve stem base broken away so as to illustrate the insert of the base.

In Fig. 9 the patch or base 31 is shaped as to have the form of a drop-center rim 32, which when the tube, stem and patch or base are mounted on the rim fills the drop center of the latter adjacent the rim opening and acts to brace and support the tube at this point.

It will be understood that the patch which is employed in various instances can vary in structure to suit particular conditions and that the specific forms of patches or bases shown herein should not be construed as limiting the present invention thereto, but are illustrated and described merely by way of example.

Figure 10:
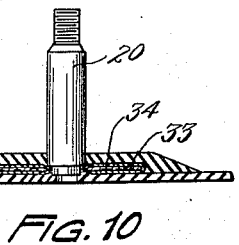
Fig. 10 is a view similar to Figs. 3, 6, 7 and 8 but illustrates a different form of valve stem base and insert therefor from those shown in the previous views.

A further embodiment of the invention is illustrated in Figs. 10 and 11, wherein the insert reenforcement 33 is formed of cord fabric, such as the cord fabric employed in the manufacture of cord tire casings or any other cord fabric of suitable strength and structure. The stem 20 may be secured to the cord fabric insert reenforcement 33 by means of a thin metal strip 34 of substantially the same width as the diameter of the stem 20 and which envelops the cord fabric insert reenforcement 33 by being bent so as to lie above and below said insert reenforcement. The end of the stem passes through openings in both branches of the metal strip and through the cord fabric insert reenforcement and the strip and stem are then united by brazing, electric welding, soldering or other suitable means which has been previously referred to. The insert reenforcement 33, strip 34 and stem 20 can be secured to a tire tube as explained in connection with the other embodiments of the invention heretofore described.

Although the embodiments of the invention which have been previously described herein have all included reenforcing inserts for the bases of the stems, it is not necessary that such insert reenforcement be employed and perhaps, in accordance with my present point of view, it would be preferable to omit such insert reenforcements in some instances and to connect the stem to the tube by merely employing a rubber base without the reenforcing insert thereby effecting an additional economy in manufacture. A construction of this character will be described in connection with the explanation of that phase of the invention relating to the method of manufacturing the tire tube and valve stems at the same time and uniting the same into a single, integral structure. The method phase of the invention will now be described in detail with particular reference to Figs. 12 to 15 of the drawings.

As previously stated, the invention contemplates a method of manufacturing at the same time and as integrated units tire tubes or other inflatable rubber articles and rubber valve stems therefor and wherein the tubes and stems are integrally united by a single molding and vulcanizing operation which simultaneously cures the rubber of the tubes and stems to the required extent and integrally unites and merges the same. As will become apparent during the description of the method, resultant economies are effected thereby, due to the elimination of separate manufacturing and vulcanizing steps, and furthermore since the rubber of the stems and the rubber of the tubes is merged and integrally united and cured to the required extent, the danger of the stems pulling off of the tubes is eliminated.

As illustrative of one way in which the method may be carried out, a tube indicated at 35 in Fig. 12 is formed of crude or uncured rubber stock. A metal valve stem or rigid tubular member 36, to the inner end of which rubber cement may be applied if desired, is then positioned in the desired location upon the tube 35 by means of a piece or chunk of crude or uncured rubber stock 37. The piece or chunk of crude or uncured rubber stock 37 will adhere to the rubber of the tube and hold the stem in position, so that the tube with the stem thereon, can be placed in a vulcanizing mold having a valve stem cavity therein. The tube may be provided with an opening 35a, and the stem so positioned on the tube that its bore will register with said opening or the tube may be made without an opening and then pierced after the stem has been arranged thereon by suitable means that is inserted through the stem, such for example, as an electric needle as previously described herein. The uncured tube 35, with the member 36 and piece or chunk of crude rubber 37 in position thereon and approximating a valve stem, is then placed in a suitable vulcanizing mold, such as a mold of the watch case type, as indicated at 38 in Figs. 13, 14 and 15. The stem 36, as is well understood in the art, will extend through the mold and is adapted to receive upon its threaded outer end or nipple a coupling member of a fluid pressure supply line, whereby when the mold is closed the tube can be inflated for its vulcanization within the mold. The mold 38 will be provided, at the portion thereof through which the stem extends, with a plug 39, which might be either a separate plug member secured in the mold, or could be integrally formed as a part of the mold, and which would have cut therein a suitable bore through which the stem 36 would extend and which bore communicates at its inner end with a suitably shaped recess or cavity formed in the portion 39 for forming or finishing the piece or chunk of uncured rubber stock 37 into the final shape of the rubber valve stem. In this connection it might be well to point out that the piece or chunk of rubber 37, if desired, could be partially preformed into the approximate shape before the tube was mounted in the mold, or it could without any preforming thereof other than just enough to allow it to enter the recess or valve stem cavity of the mold be shaped into final valve stem form by the recess or valve stem cavity formed in the portion 39 of the mold when the tube was inflated for the vulcanization process. As previously stated, the tube and the piece of uncured rubber stock may be positioned in the mold and valve stem cavity at the same time or they may be separately positioned in the mold and valve stem cavity. In any event the piece of uncured stock is either arranged in the cavity or contiguous thereto, so that when the tube is inflated it will be pressed firmly against the outer surface of the tube by the walls of the mold end cavity, as well as into tight engagement with the walls of the cavity. It is essential that the tube and the base and other portions of the rubber stem each be vulcanized to the required extent during the vulcanization process. Inasmuch as certain portions of the rubber stem would not ordinarily be subjected to the same degree of heat as would the tube, due to the construction of the mold and the fact that such portions are removed from the vulcanization chamber, it is proposed to subject the rubber of the stem to an additional or greater source of heat and which might be independent of the source of heat for the vulcanization of the tube. This is also desirable, inasmuch as the rubber of the stem is usually thicker than the rubber of the tube, and hence would customarily require a greater length of time to be vulcanized to the required extent than would the rubber of the tube. As is well understood in the art, vulcanizing molds are usually provided with a steam circulating chamber around the article being vulcanized and in which steam is injected and circulated and in carrying out the present method that portion of the mold having the valve stem cavity therein and through which the stem extends could be, if desired, provided with cored out passages or chambers communicating with the usual steam circulating chamber of the mold, wherefore the steam would circulate about the valve stem in close proximity thereto.

However, as illustrated in Figs. 13 and 14, the portion 39 of the mold 38 is provided with a chamber 40 surrounding the valve stem, but not in communication with the usual steam chamber of the mold. A suitable heating agent, such as superheated steam, would be introduced into and circulated through the chamber 40 by means of conduit pipes 41 connected with the chamber and with a supply source for the heating agent. In this way it is assured that a sufficient degree of heat would be applied to the stem in close proximity thereto so that the rubber of the stem would be vulcanized to the required extent in a given period of time i. e., the period required for correctly vulcanizing the tube.

From the foregoing it will be understood that when the tube is in the mold and is inflated the pressure of the fluid within the tube will force the chunk or piece of crude or uncured rubber 37 that has been located contiguous to the recess or cavity formed in the portion 39 of the mold into the same in tight engagement with the walls thereof and impart to said piece or chunk of rubber the desired or final valve stem shape. Also the mold might be so constructed at the portion 39 as to exert mechanical pressure on the piece or chunk of rubber. As illustrated in Fig. 13, the piece or chunk of rubber 37 when brought into its final form includes a base portion 37a, together with a tapered boss portion 37b th .t extends a short distance around the inner end of the stem or tubular rigid member 36, the major portion of which will not be covered by rubber. The simultaneous vulcanization or curing of the rubber of the tube and of the piece or chunk of rubber 37 acts to unite or merge the base 37a and the tube 35 into an integral unit and also effects the desired adhesion of the piece of rubber 37 to the valve stem or tubular rigid member 36, wherefore when the tube is removed from the mold the valve stem will be an integral part thereof and will be so firmly secured thereto as to have the requisite strength for the uses to which it will be subjected.

In Fig. 14 is illustrated a different form of valve stem which may be constructed by the present invention than that shown in Fig. 13. The valve stem shown in Fig. 14 is provided with a rubber tubular portion 37c that extends substantially the full length of the stem, that is, to adjacent the threaded nipple at the outer end of the stem. In place of the stem 36 a shorter tubular member or insert 36a is arranged in the rubber portion 37c and this member corresponds to the usual metal insert employed in rubber valve stems and adapted to receive the valve insides of the core. In utilizing the present method for forming a valve stem, such as shown in Fig. 14, a piece of uncured rubber stock is positioned about the insert 36a and is of such size that when it is formed up it will cover the insert as illustrated and will also provide sufficient stock to form the base and the lower part of the portion 37c. This piece of rubber with the insert therein can be positioned upon the crude rubber tube which, in the present instance, has not been provided with an opening 35a. A hollow needle 42 is passed through the insert 36a and through the piece or chunk of rubber and the tire tube, as clearly shown in Fig. 14, and the outer end of this needle can be connected to a supply line for fluid pressure, wherefore the fluid pressure for inflating the tube and forcing the piece of rubber stock into the required shape in the curing mold, that is into the shape having the base 37a and the portion 37c that extends into the tapered bore through the part 39 of the mold, can be injected into the tube through the needle 42. When this has taken place the tube and the piece of rubber stock are simultaneously cured by the application of heat as described in connection with Fig. 13, and after the curing operation the needle 42 can be removed and the tube with the valve stem integrally united therewith and forming a part of the tube, can be removed from the mold.

In Fig. 15 the valve stem shown corresponds to that shown in Fig. 13, in that the rubber base of the stem is provided with a short boss 37b extending partly the length of the stem or tubular rigid member 36. However, in place of using a steam chamber 40 for providing the desired heat for the vulcanization of the rubber of the stem, electrical heating units 43 are arranged in the portion 39 of the mold for this purpose.

From the foregoing description it will be seen that a rubber valve stem and tube can be constructed at the same time in accordance with the present invention very economically, in that the rubber of the tube and stem is simultaneously cured to the required extent in a single operation, as distinguished from separate curing operations; it being remembered that rubber valve stems heretofore have been semi-cured by a separate curing operation before they are applied to the tire tubes. The manner in which the bases of the stems are merged into and integrally united with the tubes insures an air-tight connection therebetween and one which will possess the requisite strength in service.

The term "chunk" of uncured rubber stock as used in certain of the claims connotes a mass of raw rubber of such size and shape that it can be molded by the stem cavity to form the desired rubber stem having the usual base portion and outwardly extending stem portion.

The term "partially formed" as used in the claims hereof and with reference to the valve stem or piece or chunk of uncured rubber means that the stem or piece or chunk of raw rubber is formed or shaped at least sufficiently to enable it to enter the valve stem cavity of the curing mold and be brought into final form during the curing operation.

Although the invention has been specifically illustrated and described in detail with reference to a tire tube, it should be understood that it may be equally as effectively utilized for various other inflatable rubber articles.

Although several preferred embodiments of the invention have been illustrated and described herein, it should be understood that the invention is susceptible of various modifications and adaptations within the scope of the appended claims.

Having thus described my invention I claim:

1. The method of manufacturing at the same time and as an integrated unit, a tire tube and a rubber valve stem therefor, which comprises forming the tube and partially forming the valve stem from uncured rubber stock and placing the same while in the uncured condition in a curing mold having therein a tube cavity and a valve stem cavity in communication with each other, with the tube and stem so arranged in the mold that the partially formed valve stem will enter the stem cavity, inflating said tube in the mold to cause the same to fill the tube cavity and to be pressed firmly against said partially formed stem to force the latter tightly into engagement with the wall of said stem cavity, and simultaneously heat curing the inflated tube and said stem whereby the same are integrally united and final form is imparted to said stem.

2. The method of manufacturing at the same time and as an integrated unit, a tire tube and a rubber valve stem therefor, which comprises forming the tube from uncured rubber stock, placing the uncured tube in the tube cavity of a curing mold having therein a tube cavity and a stem cavity adapted to form a hollow valve stem and in communication with each other, placing in the mold a chunk of uncured rubber stock so as to be associated with the stem cavity, inflating said tube in the mold to cause the same to fill the tube cavity and to be pressed firmly against said chunk of rubber stock to force the latter into engagement with the wall of said stem cavity and simultaneously heat curing said inflated tube and chunk of stock whereby the same are integrally united and the chunk is given hollow valve stem form.

3. The method of manufacturing at the same time and as an integrated unit a tire tube and a rubber valve stem therefor, which comprises forming the tube from uncured rubber stock, placing the formed uncured tube in a curing mold having therein a tube cavity and a valve stem cavity in communication with each other, and placing in the stem cavity of the mold a piece of uncured partially formed rubber stock having at least a portion of a rigid member embedded therein, inflating said uncured tube in the mold to cause the same to fill the tube cavity and to be pressed firmly against said piece of uncured rubber stock to force the latter into engagement with the wall of said stem cavity and closely about said rigid member and simultaneously heat curing said inflated tube and piece of stock whereby the same are integrally united and final valve stem form is imparted to said piece of stock.

4. The method of manufacturing at the same time and as an integrated unit a tire tube and a rubber valve stem therefor, which comprises forming the tube from uncured rubber stock, placing on the outer surface of the tube a chunk of uncured rubber stock, positioning the uncured tube with the uncured chunk of stock thereon in a curing mold having therein a tube cavity and a stem cavity adapted to form a hollow valve stem and in communication with each other, with the uncured tube arranged in said tube cavity and the uncured chunk of stock associated with said stem cavity, inflating said uncured tube in the mold to fill the same and to be firmly pressed against said uncured chunk of stock to press the latter into the said stem cavity and tightly against the wall thereof and simultaneously heat curing said inflated tube and chunk of stock whereby the same are integrally united and hollow valve stem form is imparted to said chunk of stock.

5. The method of manufacturing at the same time and as an integrated unit, a tire tube and a rubber valve stem therefor, which comprises forming the tube from uncured rubber stock, placing on the outer surface of the tube a chunk of uncured rubber stock having at least a portion of a rigid member embedded therein, positioning the uncured tube with the uncured chunk of stock thereon in a curing mold having therein a tube cavity and a valve stem cavity in communication with each other, with the tube arranged in said tube cavity and the chunk of stock associated with said stem cavity, inflating said tube in the mold to fill the tube cavity and to be firmly pressed against said chunk of stock to press the latter into the said stem cavity and tightly against the wall thereof and closely about said rigid member, and simultaneously heat curing said inflated tube and chunk of stock whereby the same are integrally united and valve stem form is imparted to said chunk of stock.

6. The method of manufacturing at the same time and as an integrated unit a tire tube and a rubber valve stem therefor, which comprises forming the tube from uncured rubber stock, positioning on the outer surface of the tube a partially formed uncured rubber valve stem having at least a portion of a rigid tubular member embedded therein, placing the formed uncured tube with the partially formed uncured valve stem thereon in a curing mold having therein a tube cavity and a valve stem cavity in communication with each other, with the stem associated with said stem cavity, inflating said tube in the mold to fill the same and to be pressed firmly against said partially formed valve stem to force the latter into tight engagement with the wall of said stem cavity and closely about said rigid member, and simultaneously heat curing said inflated tube and said partially formed valve stem whereby the same are integrally united and final form is imparted to the valve stem and said member is vulcanized therein.

7. The method of manufacturing at the same time and as an integrated unit a tire tube and a rubber valve stem therefor, which comprises forming the tube from uncured rubber stock, placing the same in a curing mold having therein a tube cavity and a stem cavity adapted to form a hollow valve stem and in communication with each other and associating a chunk of uncured rubber stock with said stem cavity, inflating said tube in the mold to fill the tube cavity and be firmly pressed against said chunk of rubber stock to force the latter into tight engagement with the wall of said stem cavity, and then applying heat to said inflated tube while at the same time independently applying heat to said chunk of rubber stock adjacent to said stem cavity whereby the tube and stock are cured and integrally united and hollow valve stem form is imparted to said chunk of stock.

8. The method of manufacturing at the same time and as an integrated unit a tire tube and a rubber valve stem therefor, which comprises forming a tube from uncured rubber stock, placing on the outer surface of the tube a partially formed uncured rubber valve stem having a rigid member embedded therein, placing the uncured tube with the uncured partially formed stem therein in a curing mold having therein a tube cavity and a valve stem cavity in communication with each other and with the stem associated with the stem cavity, inflating said tube to fill the tube caviy and be firmly pressed against said stem to force the latter into tight engagement with the wall of said stem cavity, and then applying heat to said tube while at the same time independently applying heat to said stem to simultaneously cure said tube and stem to the required extent and to integrally unite the same and impart final form to said stem.

9. The method of manufacturing at the same time and as an integrated unit a tire tube and a rubber valve stem therefor, which comprises forming the tube from uncured rubber stock, positioning the uncured tube in a curing mold having therein a tube cavity and a valve stem cavity in communication with each other and associating with said valve stem cavity a chunk of uncured rubber stock having at least a part of a rigid member embedded therein, inflating said tube in the tube cavity to fill the same and to be firmly pressed against said chunk of rubber stock to force the latter into tight engagement with the wall of said stem cavity and closely about said rigid member, and applying heat to said inflated tube while at the same time independently applying heat to said chunk of stock to simultaneously cure said tube and chunk of stock to the required extent whereby the same are integrally united and the chunk of stock is given valve stem form.

10. The method of manufacturing at the same time and as an integrated unit a tire tube and a rubber valve stem therefor, which comprises forming the tube and partially forming a valve stem having a passage therethrough from uncured rubber stock and placing the same in uncured condition in a curing mold having therein a tube cavity and a valve stem cavity in communication with each other and with the partially formed stem associated with said stem cavity, inflating said tube by passing fluid under pressure through said partially formed stem to cause the tube to fill the tube cavity and to be firmly pressed against said stem to force the latter tightly into engagement with the wall of said stem cavity, and simultaneously heat curing the inflated tube and said stem whereby the same are integrally united and final form is imparted to said stem.

11. The method of manufacturing at the same time and as an integrated unit a tire tube and a rubber valve stem therefor, which comprises forming the tube from uncured rubber stock and partially forming from uncured rubber stock a valve stem having at least a part of a rigid tubular member embedded therein, placing said uncured tube and partially formed uncured stem in a curing mold having therein a tube cavity and a valve stem cavity in communication with each other and with the partially formed stem associated with the stem cavity, inflating said tube by passing fluid under pressure through said member and stem to cause the tube to fill the tube cavity and to be pressed firmly against said stem to force the latter tightly into engagement with the wall of said stem cavity, and simultaneously heat curing the inflated tube and said stem whereby the same are integrally united and final form is imparted to said stem.

12. The method of manufacturing at the same time and as an integrated unit a tire tube and a rubber valve stem therefor, which comprises forming the tube from uncured rubber stock and partially forming from uncured rubber stock a valve stem having at least a portion of a rigid tubular member embedded therein, placing said uncured tube and partially formed uncured stem in a curing mold having therein a tube cavity and a valve stem cavity in communication with each other and with the partially formed stem associated with the stem cavity, inflating said tube by passing fluid under pressure through said member and stem to cause the tube to fill the tube cavity and to be pressed firmly against said stem to force the latter tightly into engagement with the wall of said stem cavity, and then applying heat to said tube while at the same time independently applying heat to said stem to simultaneously cure said tube and stem to the required extent and integrally unite the same and impart final form to said stem and vulcanize said member therein.

ADELBERT E. BRONSON.